United States Patent
Doyle et al.

(10) Patent No.: US 8,326,642 B2
(45) Date of Patent: Dec. 4, 2012

(54) ELECTRONIC RECEIPT MANAGEMENT

(75) Inventors: Ronald P. Doyle, Raleigh, NC (US); Susan R. Doyle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2553 days.

(21) Appl. No.: 10/663,509

(22) Filed: Sep. 16, 2003

(65) Prior Publication Data

US 2005/0060437 A1    Mar. 17, 2005

(51) Int. Cl.
*G06Q 10/00* (2012.01)

(52) U.S. Cl. .................................................... 705/1.1

(58) Field of Classification Search .................. None
See application file for complete search history.

(56) References Cited

U.S. PATENT DOCUMENTS

| | | | | |
|---|---|---|---|---|
| 5,739,512 A | * | 4/1998 | Tognazzini | 235/380 |
| 5,884,271 A | * | 3/1999 | Pitroda | 705/1 |
| 6,487,540 B1 | * | 11/2002 | Smith et al. | 705/21 |
| 7,016,877 B1 | * | 3/2006 | Steele et al. | 705/50 |
| 2004/0083170 A1 | * | 4/2004 | Bam et al. | 705/40 |

* cited by examiner

*Primary Examiner* — Gerardo Araque, Jr.
(74) *Attorney, Agent, or Firm* — Steven M. Greenberg, Esq.; Carey, Rodriguez, Greenberg & O'Keefe

(57) ABSTRACT

A receipt management system, method and article of manufacture. The article of manufacture can include a storage medium configured to store receipt data from multiple disparate vendors, communications logic for establishing a communicative link between the system and receipt data processing logic disposed within individual ones of the multiple disparate vendors, and a receipt management processor programmed to moderate access to the storage medium. Importantly, the storage medium can be a portable mass storage device. Notably, each of the storage medium, communications logic and receipt management processor can be disposed in a pervasive device, or in a personal article.

8 Claims, 2 Drawing Sheets

ELECTRONIC RECEIPT MANAGEMENT

BACKGROUND OF THE INVENTION

1. Statement of the Technical Field

The present invention relates to the field of retail sales and more particularly to managing receipts for retail purchases.

2. Description of the Related Art

The venerable receipt provides physical evidence of the consummation of the purchase of goods or services. Generally, the receipt can include a record both of the product or service purchased, the purchase price, and the mode of payment. Optionally, the receipt can specify a date and time of purchase, and identifying information relating both to the vendor and the purchaser. Receipts can range from printed tape receipts produced by conventional cash registers to electronic mail inserts distributed over the global Internet.

Within the retail industry, products often can be returned for exchange or for full or partial refund. Additionally, most warranty work requires evidence of product purchase. Finally, many rebate offers require the presentation of an original receipt or a facsimile copy thereof. Consequently, many consumers have grown accustomed to retaining their cash receipts for days, months or even years subsequent to the purchase of retail goods. Still, most retail goods are never returned, exchanged or presented for warranty service. Moreover, the vast majority of product receipts are stored for long periods of time without purpose.

As it will be recognized by the ordinary consumer, the collection and storage of cash receipts can become unwieldy over time as dozens if not hundreds of small and large slips of paper alike can be misplaced, lost or otherwise destroyed. Locating any one receipt amongst dozens also can be problematic and cleansing ones collection of receipts can be difficult and typically requires the manually sifting through a pile of receipts to locate those receipts which have become temporally or substantively stale and no longer require retention.

SUMMARY OF THE INVENTION

The present invention addresses the deficiencies of the art in respect to receipt management and provides a novel and non-obvious method, system and apparatus for managing receipts electronically in a receipt management system. Importantly, unlike conventional receipt management techniques, in the present invention, electronic receipts can be received directly from the vendor at the time of purchase and can be uploaded into a centralized data store of cash receipts. So as to distinguish between different receipts from multiple disparate vendors, each receipt stored in the centralized data store can be associated with a unique identifier, such as a vendor identifier or transaction identifier. Once stored, the receipts can be managed, purged when appropriate and retrieved on demand and provided electronically to authenticated vendors.

In a preferred aspect of the present invention, a receipt management article of manufacture can include a storage medium configured to store receipt data from multiple disparate vendors. The article of manufacture also can include communications logic for establishing a communicative link between the system and receipt data processing logic disposed within individual ones of the multiple disparate vendors. Finally, a receipt management processor can be programmed to moderate access to the storage medium. Importantly, the storage medium can be a portable mass storage device, such as a smart digital card, a Memory Stick™, a compact flash card, a universal serial bus (USB) mass storage device and the like.

Notably, each of the storage medium, communications logic and receipt management processor can be disposed in a pervasive device. Pervasive devices can include, for instance, a personal digital assistant (PDA), a cellular telephone, hand-held computer, and the like. Alternatively, each of the storage medium, communications logic and receipt management processor can be disposed in a personal article. Personal articles can items which are designed for close association with a person, such as a credit card device, a key chain fob, a purse, a wallet, and the like.

A method for electronic receipt management can include establishing a communicative link between a data store of electronic receipts from multiple disparate vendors, and an individual one of the multiple disparate vendors. The individual one of the multiple disparate vendors can be authenticated and a specific electronic receipt stored within the data store can be located which corresponds to an identifier provided by the individual one of the multiple disparate vendors. Finally, the located specific electronic receipt can be transmitted to the individual one of the multiple disparate vendors over the established communicative link.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a receipt management system, method and apparatus. In accordance with the present invention, receipts can be electronically uploaded to a receipt management storage medium and classified according to a vendor identifier. Receipts can be managed within the storage medium through a receipt management process, which process can include deleting, re-classifying and archiving the receipts, for example. Access to the receipts can be moderated by recognized security and authentication techniques, including public key encryption. When required, individual receipts stored in memory can be downloaded to vendor computing devices for use in processing a vendor transaction, such as a return, exchange, warranty service or a rebate.

Figure 1:
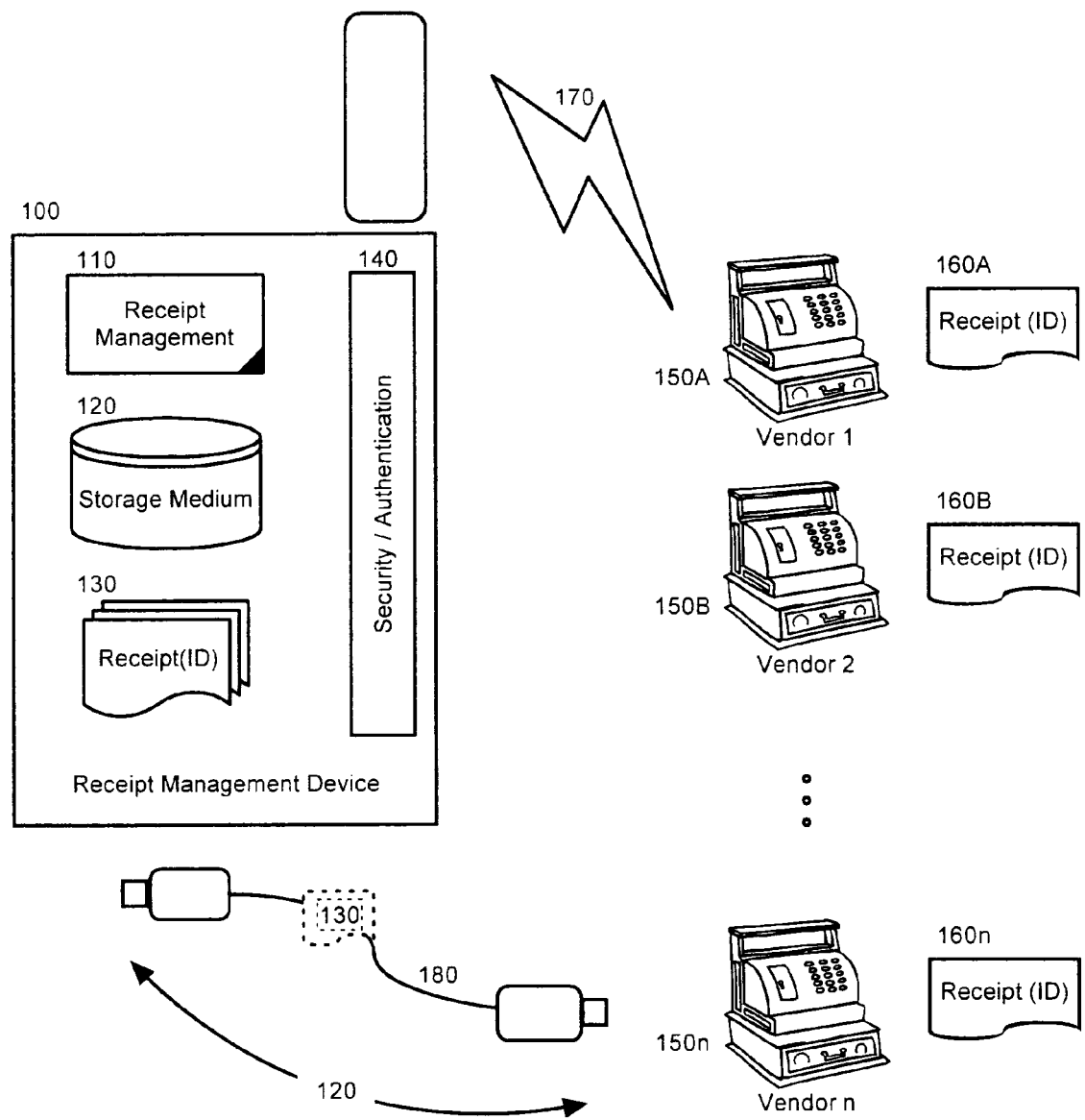
FIG. 1 is a schematic illustration of a receipt management system which has been configured in accordance with the inventive arrangements; and, FIG. 2 is a flow chart illustrating a process of managing receipts in the receipt management system of FIG. 1.

FIG. 1 is a schematic illustration of a receipt management system which has been configured in accordance with the inventive arrangements. As shown in FIG. 1, a receipt management system 100 can include a receipt management processor 110 and a storage medium 120 configured to store a multiplicity of receipts 130 produced by different vendors 150A, 150B, 150n. Access to the receipts 130 in the storage medium can be moderated by security and authentication logic 140 which can implement any conventional security and authentication scheme, such as conventional password protection, ordinary symmetrical or asymmetrical encryption and decryption, and the like.

In operation, individual receipts 160A, 160B, 160n corresponding to specific ones of the different vendors 150A, 150B, 150n can be uploaded to and downloaded from the storage medium 120 over a wireless communications link 170, for example an infrared communications link, a short range radio frequency link such as Bluetooth, or a wireless network communications link such as any of the 802.11x variants. Alternatively, individual receipts 130 can be exchanged through a wirebound link 180 such as a USB implementation. Finally, individual receipts 130 can be retrieved from the storage medium 120 where the storage medium 120 is portable in nature such as a smart digital card, a Memory Stick™, a compact flash card, a floppy disk, and the like. In that case, the storage medium 120 can be processed in any number of card readers known in the art and coupled to individual ones of the vendors 150A, 150B, 150n.

Figure 2:
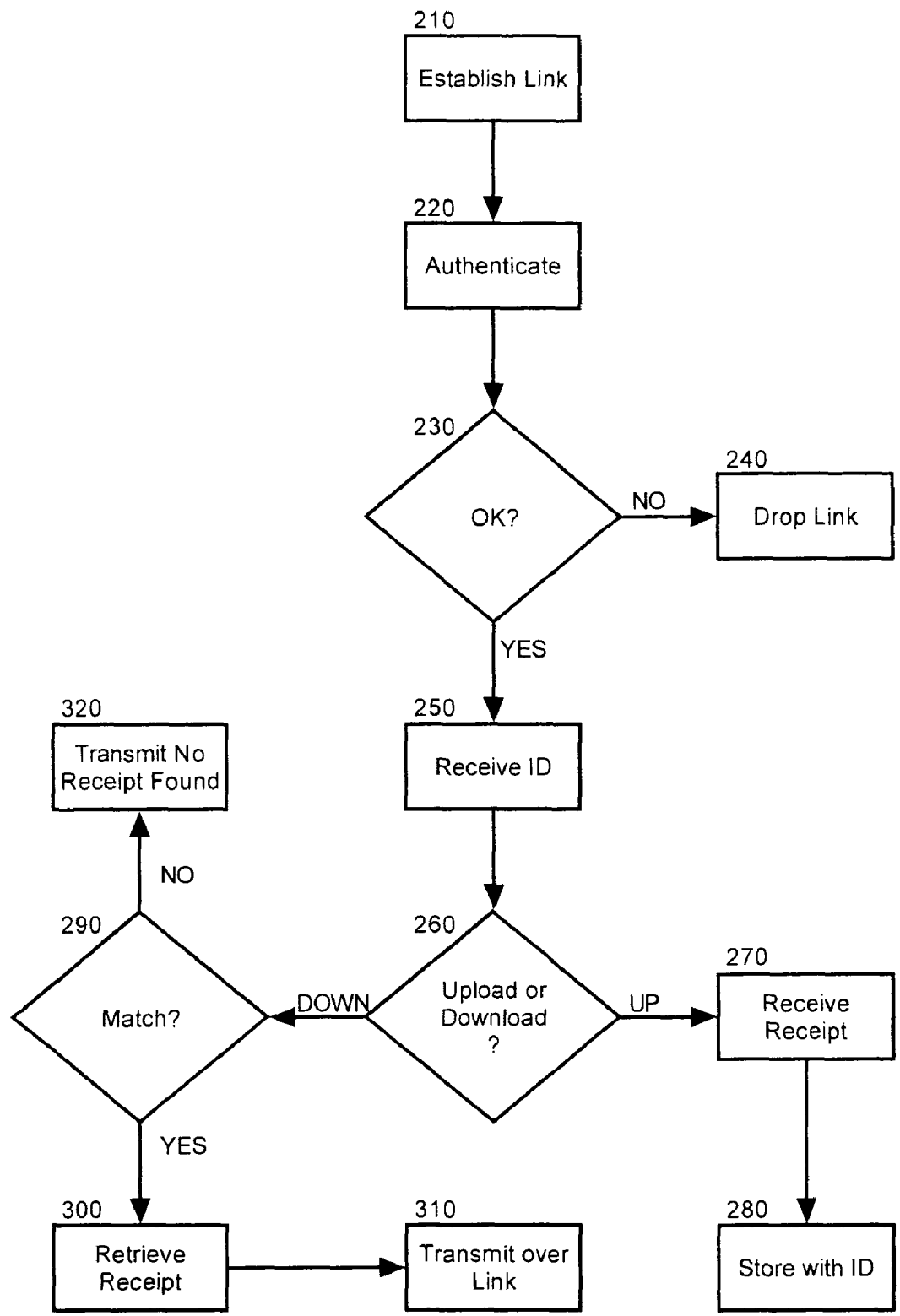

Notably, each exchange of an individual one of the receipts 130 can be managed through the receipt management processor 110. In this regard, FIG. 2 is a flow chart illustrating a process of managing receipts in the receipt management processor 110 of FIG. 1. Beginning in block 210 a communicative link can be established between the processor and a vendor such as through a wireless or wirebound link, or by insertion of a storage medium in a card reader. In block 220, the identity of the vendor can be authentication, for instance through password or certificate verification. If in decision block 230, the vendor can be authenticated, the process can continue through block 250. Otherwise, the link can be terminated in block 240.

In block 250, a specific identifier associated either with the vendor or with a purchase transaction can be provided to the receipt management processor and in decision block 260 it can be determined whether an uploading or downloading transaction is desired. If an uploading transaction is desired, in block 270 receipt data can be received from the vendor and in block 280 the receipt data can be stored in the storage medium by reference to the specific identifier. In this way, the stored receipt data can be subsequently retrieved by reference to the specific identifier, regardless of the physical terminal used to access the storage medium.

Returning now to decision block 260, if a download transaction rather than an upload transaction is desired, in decision block 290 it can be determined whether a match can be found as between the specific identifier and a stored receipt. In this regard, all receipts can be retrieved for the authenticated vendor and a specific receipt can be located, or the specific receipt can be located directly by reference to an identifier unique to the receipt. In either case, if no match can be established in decision block 290, a message can be forwarded to the vendor in block 320 indicating that no matching receipt could be found. Otherwise, in block 300 the matching receipt can be retrieved from storage and in block 310 the retrieved receipt can be transmitted to the vendor over the communications link.

It will be recognized by the skilled artisan that by storing purchase receipts centrally in a storage medium, regardless of vendor, the management of the receipts can be greatly simplified. First, once stored in the storage medium, the receipts cannot be misplaced and can be located through a simple user interface configured to perform standard data location queries against the storage medium. Moreover, an unlimited number of copies of the receipts can be created which can be helpful when processing rebate or warranty service requests.

Importantly, stale receipts can be manually or automatically purged based upon purchase date, for example. Yet, stale receipts need never be purged, but can be archived elsewhere such as in the consumer's personal computer from which permanent storage can be established such as a CD-ROM. Finally, as many of the infrastructure elements of the foregoing receipt management system can be present in a conventional pervasive device, including the storage medium, secure authentication logic and communications logic block, the receipt management system can be established in programmatic logic and executed within a pervasive device such as a personal digital assistant.

To that end, the present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for electronic receipt management comprising the steps of:
    establishing a communicative link between a data store of electronic receipts from multiple disparate vendors, and an individual one of said multiple disparate vendors;
    authenticating said individual one of said multiple disparate vendors;
    locating a specific electronic receipt stored within said data store which corresponds to an identifier provided by said individual one of said multiple disparate vendors; and,
    transmitting said located specific electronic receipt to said individual one of said multiple disparate vendors over said established communicative link.

2. The method of claim 1, wherein said establishing step comprises the step of configuring a wireless communications link with said individual one of said multiple disparate vendors.

3. The method of claim 1, wherein said establishing step comprises the step of configuring a wirebound communications link with said individual one of said multiple disparate vendors.

4. The method of claim 1, wherein said establishing step comprises the step of inserting a portable storage medium containing said data store into a reader coupled to said individual one of said multiple disparate vendors.

5. A computer-readable medium having stored thereon a computer-readable instructions for electronic receipt management, the computer-readable instructions for causing a computer system to perform the steps of:

establishing a communicative link between a data store of electronic receipts from multiple disparate vendors, and an individual one of said multiple disparate vendors;

authenticating said individual one of said multiple disparate vendors;

locating a specific electronic receipt stored within said data store which corresponds to an identifier provided by said individual one of said multiple disparate vendors; and, transmitting said located specific electronic receipt to said individual one of said multiple disparate vendors over said established communicative link.

6. The machine readable storage of claim 5, wherein said establishing step comprises the step of configuring a wireless communications link with said individual one of said multiple disparate vendors.

7. The machine readable storage of claim 5, wherein said establishing step comprises the step of configuring a wirebound communications link with said individual one of said multiple disparate vendors.

8. The machine readable storage of claim 5, wherein said establishing step comprises the step of inserting a portable storage medium containing said data store into a reader coupled to said individual one of said multiple disparate vendors.

\* \* \* \* \*